US006663174B2

(12) United States Patent
Drage et al.

(10) Patent No.: US 6,663,174 B2
(45) Date of Patent: Dec. 16, 2003

(54) PASSENGER CHAIR

(75) Inventors: Thorbjørn Drage, Trondheim (NO); Erlend Langsrud, Trondheim (NO)

(73) Assignee: Sit Safe AS, Frosta (NO)

( * ) Notice: Subject to any disclaimer, the term of this patent is extended or adjusted under 35 U.S.C. 154(b) by 0 days.

(21) Appl. No.: 10/184,106

(22) Filed: Jun. 28, 2002

(65) Prior Publication Data

US 2003/0011220 A1 Jan. 16, 2003

Related U.S. Application Data

(63) Continuation of application No. PCT/NO00/00434, filed on Dec. 19, 2000.

(30) Foreign Application Priority Data

Dec. 29, 1999 (NO) .................................................. 996560

(51) Int. Cl.⁷ .......................... A47C 13/00; A47C 1/08; B60N 2/30
(52) U.S. Cl. ........................ 297/112; 297/114; 297/118; 297/130; 297/234; 297/235; 297/238; 297/254; 297/255; 297/250.1
(58) Field of Search ................................. 297/112, 114, 297/118, 130, 250.1, 254, 255, 238, 234, 235

(56) References Cited

U.S. PATENT DOCUMENTS

| 24,511 A | * | 6/1859 | Wagner et al. .............. 297/112 |
| 3,951,450 A | | 4/1976 | Gambotti ..................... 297/238 |
| 4,655,503 A | * | 4/1987 | Kamijo et al. ............... 297/238 |
| 5,035,465 A | * | 7/1991 | Hanai et al. ................. 297/238 |
| 5,722,724 A | * | 3/1998 | Takei et al. ............. 297/114 X |
| 6,502,901 B2 | * | 1/2003 | Deptolla ....................... 297/238 |
| 2001/0009335 A1 | * | 7/2001 | Deptolla ....................... 297/238 |

FOREIGN PATENT DOCUMENTS

| EP | 0770516 A2 | 5/1997 |
| FR | 2713999 | 6/1995 |
| FR | 2743535 | 7/1997 |
| NO | 171542 | 12/1992 |
| WO | WO83/03978 | 11/1983 |
| WO | WO92/12024 | 7/1992 |
| WO | WO96/38317 | 12/1996 |

* cited by examiner

Primary Examiner—Rodney B. White
(74) Attorney, Agent, or Firm—Jacobson Holman PLLC

(57) ABSTRACT

A passenger chair which can be converted into a child chair, including a floor frame, a passenger back rest with side members which are linked with rear side portions of the frame for tilting the passenger back rest backwards and forwards, the passenger back rest having a first flap the top of which is linked with an upper portion of the passenger back rest and a second flap with a first end portion which is linked with a lower end portion of the first flap. The passenger chair has a mechanism which, when the passenger back rest is moved forwards, effects a forcible rotation of the second flap to an approximately horizontal position, while at the same time the first flap is moved forwards. The first flap thereby forms a back rest and the second flap a seat of a child chair which faces in the opposite direction relative to the passenger chair.

9 Claims, 5 Drawing Sheets

PASSENGER CHAIR

This is a continuation of PCT/NO00/00434, filed Dec. 19, 2000 and published in English.

The invention relates to a passenger chair which can be converted into a child chair, as indicated in the introduction to claim 1. A chair of this type can be employed in any kind of transport means, in which adults as well as children may be transported.

A passenger chair of the above-mentioned type is known from EP 0 770 516, where the first flap can be pivoted in the same rotational direction as the passenger back rest, i.e. the passenger chair's back rest. After the passenger back rest has been pivoted into a front position wherein it rests on the passenger seat, the flap is pivoted relative to the passenger back rest, with the result that it projects forwards and upwards, forming a child's back rest, i.e. a back rest for a child, enabling the child to sit on the passenger back rest's rear surface.

Since the child's back rest is only attached at one of its end portions to the passenger back rest, i.e. that it is cantilevered, it will have a relatively weak connection with the passenger back rest and will strongly tend to give way or yield if the vehicle in which the passenger chair is mounted is in a collision. The use of this passenger chair further requires that there should be sufficient space in front of it, in order to prevent the upper portion of the passenger back rest from striking against an object during its forward rotation. This may be a problem with chairs with a long back rest, e.g. in modern buses where the passenger chairs often cannot be moved forwards or backwards in order to provide more space. In addition to unlocking or releasing the passenger back rest, in the known chair several operations are required in order to convert the chair to a child chair.

The object of the invention is to provide a passenger chair with a built-in child chair which is encumbered to a less extent by the above-mentioned disadvantages.

The characteristics of the passenger chair according to the invention will be apparent from the characterising features indicated in the claims.

The invention will now be described in more detail with reference to the drawing which schematically shows two embodiments of a passenger chair according to the invention.

Figure 1:
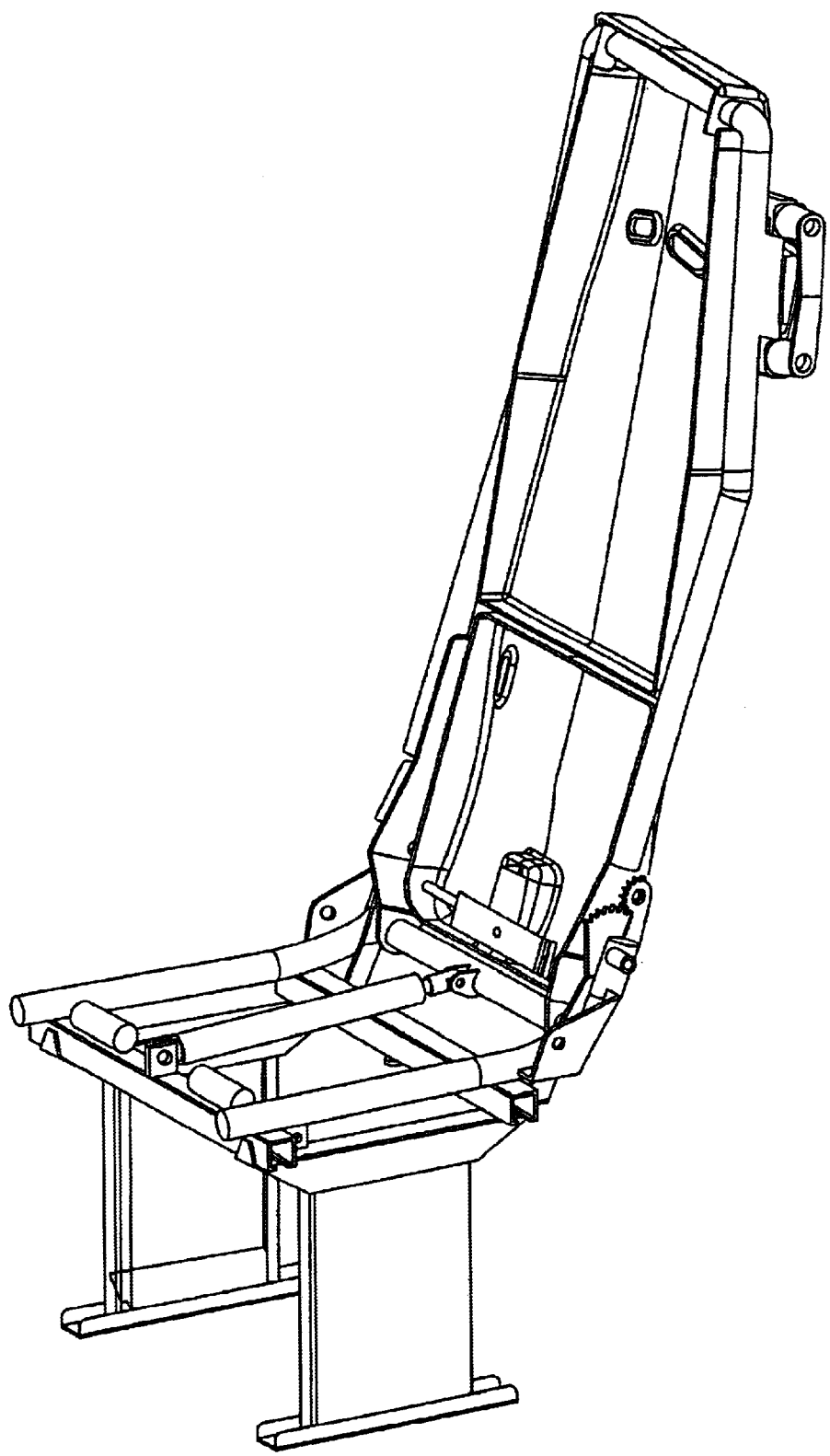
FIG. 1 is a perspective view of a first embodiment of a passenger chair with the back rest in a rear position, the chair's upholstery having been removed in order to show the chair's components.
Figure 2:
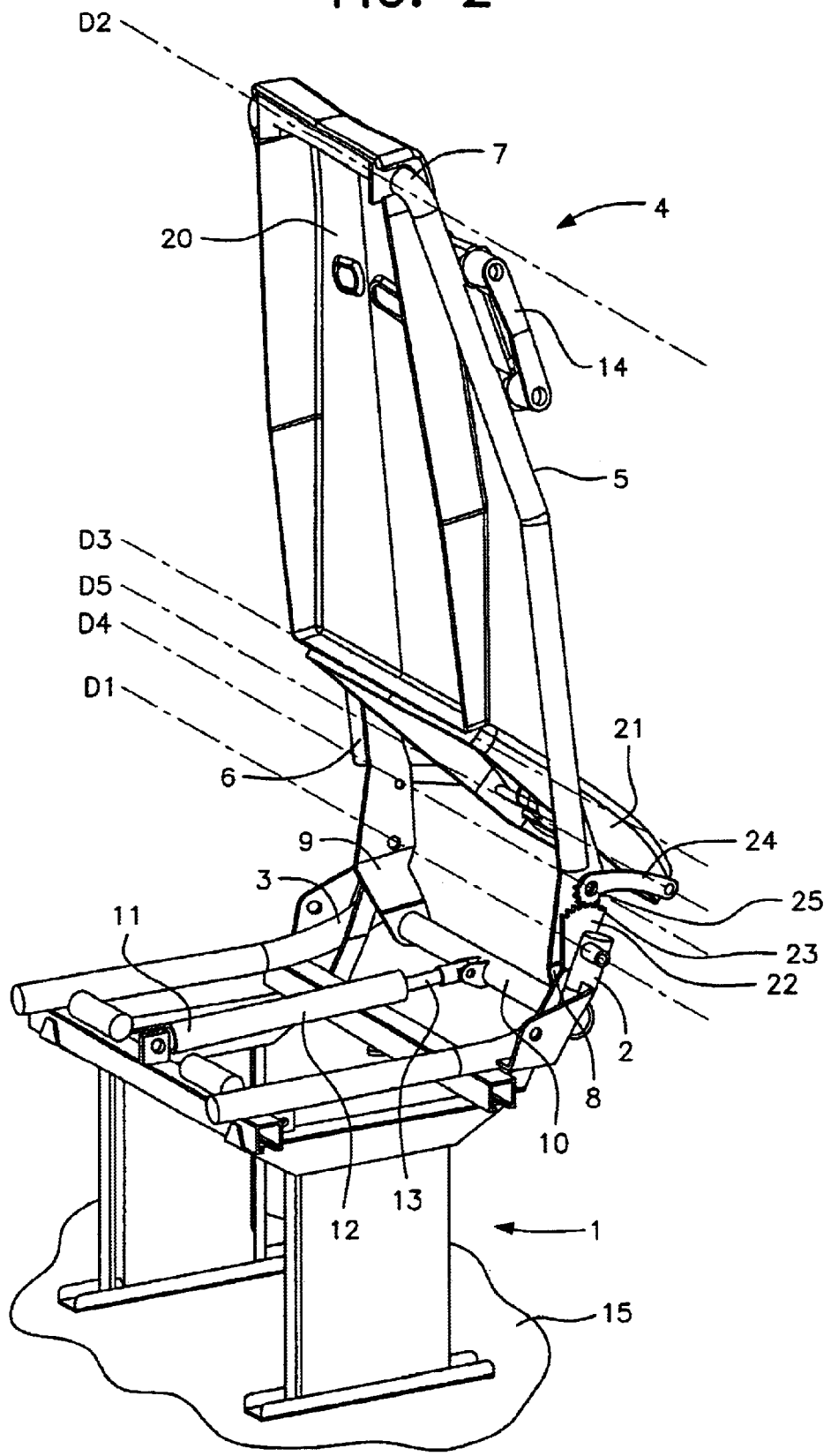
FIG. 2 is a perspective view of the passenger chair which is illustrated in FIG. 1, the chair's back rest having been pivoted an angular distance forwards from the rear position.
Figure 3:
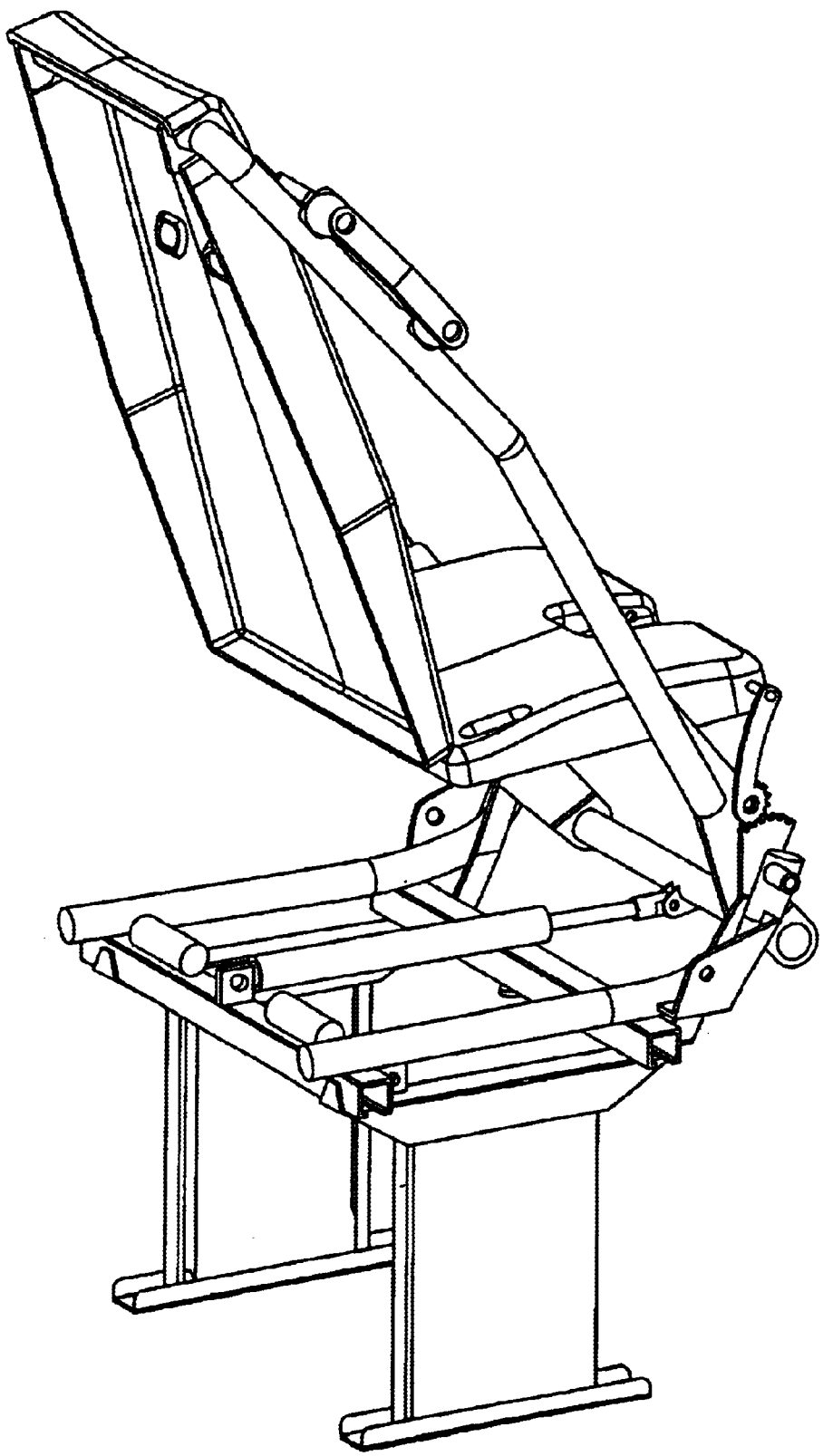
FIG. 3 is a perspective view of the passenger chair which is illustrated in FIG. 1, the chair's back rest having been pivoted to a forward position and components of the back rest having been converted into a child chair which is facing in the opposite direction to the passenger chair.

The passenger chair which is illustrated in FIGS. 1–3 comprises a frame 1 which is arranged to be securely connected with the floor 15 of the transport means, e.g. the floor of a bus. At the upper, rear portion of the frame, on each side it has upwardly projecting portions 2 and 3 respectively.

Up from the rear portion of the frame there extends a passenger back rest 4 with two side members 5 and 6 respectively, which are interconnected at the top via an upper cross piece 7. The side members 5, 6 and the cross piece 7 may advantageously be made of metal pipe.

The side members 5, 6 are at the bottom linked or articulately connected with upwardly projecting portions 2, 3 of the frame 1 respectively, via pivot pins with a common or coincident first axis of rotation D1, the pivot pins being indicated only by this axis of rotation D1. The axis of rotation D1 extends horizontally and in the passenger chair's transverse direction. Additional axes of rotation D2–D5 will be described below and it should be understood that these too extend in this way.

Each of the side members 5, 6 has lower portions 8, 9 which extend a short distance downwards from the axis of rotation D1 and which are interconnected via a lower cross piece 10. Thus by tilting the upper portion of the passenger back rest forwards, the lower portions 8, 9 of the side members 5, 6 are moved backwards.

At the upper portion of the frame there is mounted a gas spring or cylinder assembly 11 with a cylinder part 12 and a piston 13 which are connected to a front portion of the frame 1 and the lower cross piece 10 respectively. A pressure gas in a cylinder space of the gas spring hereby attempts to move the piston 13 out of the cylinder. The lower cross piece 10 can thereby be moved backwards, thereby effecting a tilting of the upper portion of the back rest forwards. The gas spring 11 may have a locking mechanism (not illustrated) whereby the gas spring's piston 13 can be secured relative to its cylinder part 12 in various relative positions. The passenger back rest can thereby be moved to different positions between an upright, slightly backward-leaning, rear position to a substantially forward-leaning, front position, in which it extends upwards and forwards. The locking mechanism can be operated by means of a handle 14 which is attached to the upper portion of the passenger back rest 4. From the handle 14 an operating cable (not illustrated) may extend in the same way as a brake cable, to the locking mechanism.

The passenger back rest comprises a first flap 20 whose upper end portion is linked with the upper cross piece 7. The flap's width is slightly less than the distance between the back rest side members 5, 6 and its length is preferably slightly greater than half the length of the passenger back rest 4. The flap can thereby rotate about a second axis of rotation D2.

The lower end portion of the first flap 20 is linked with an upper end portion of a second flap 21 whose width is also slightly less than the distance between the back rest's side members 5, 6. This flap can thereby rotate about a third axis of rotation D3.

To one of the upwardly projecting portions 2 at the frame's upper, rear portion, at one of the side members 5 of the passenger back rest 4, there is attached a lower toothed element 22, whose toothing or row of teeth 23 faces upwards and extends along a circular arc with its centre on the first axis of rotation D1.

Above the toothed element 22, linked with this member 5 is a control arm 24, one end of which is provided with a toothing or row of teeth 25 which extends along a circular arc with its centre on an axis of rotation D4 of this articulated connection or linkage. This axis of rotation may be designated as a fourth axis of rotation.

The control arm's second end portion is linked with the end portion of the second flap which is located opposite the third axis of rotation D3. This linkage's axis of rotation may be designated as a fifth axis of rotation.

Based on the assumption that the components of the passenger chair have the relative position which is illustrated in FIG. 1 where the chair can be used by an adult, the function of the passenger chair is as follows. Rotational directions of the chair's components will be indicated as they appear to the reader when considering the figures, i.e. viewed towards the passenger chair's left-hand side.

In this initial position, the gas spring's piston 13 is pushed into the cylinder part 12 and locked. The control arm, moreover, extends downwards from the fourth axis of rotation D4 and the flaps 20, 21 and the side members 5, 6 extend substantially in the same plane, together forming a flat passenger back rest, i.e. a back rest for an adult passenger in the transport means.

If the passenger chair has to be used by a child and be converted into a child chair, the handle 14 is operated to disengage the lock and release the piston 12. The lower cross piece 10 of the passenger back rest is thereby pushed backwards by means of the gas spring, and the upper portion of the passenger back rest is moved forwards, the passenger back rest being rotated about the first axis of rotation D1 in an anticlockwise direction.

The location of the linkage between the control arm 24 and the passenger back rest 4 is thereby also moved anticlockwise along a circular path, this circular path having its centre on first axis of rotation D1. On account of the mutual engagement of the control arm's toothing 25 and the toothing 23 of the element 22, the control arm 24 is hereby also forcibly rotated anticlockwise, thus causing the control arm's lower end portion, which is connected to the second flap 21, to be moved backwards and upwards. The second flap 21 is thereby also rotated anticlockwise about the third axis of rotation D3, while the first flap 20 is rotated clockwise about the second axis of rotation D2.

FIG. 2 illustrates a position after the passenger back rest has been rotated slightly from the initial position which is illustrated in FIG. 1, and FIG. 3 illustrates the passenger chair's position after its back rest has been rotated to its forward position.

When the passenger back rest has reached the position which is illustrated in FIG. 3. the handle may be operated again, thus causing the gas spring and thereby the chair's movable components to be locked relative to one another in this position.

The first flap 20 now forms a child's back rest, and the second flap 21 forms a child seat. The side members form protective pillars which are arranged to protect a child sitting in the child chair against objects which are moved towards the chair from the side. They further help to secure the child, preventing it from being flung out of the seat in a lateral direction. If the passenger chair is facing in the transport means' direction of travel, the child chair will advantageously be facing in the opposite direction.

If the passenger chair has to be converted from this position into a chair for an adult, the locking handle is operated for releasing the piston 13. By gripping the upper portion of the passenger chair's back rest and pulling the passenger back rest backwards, the gas spring's spring force can be overcome and the passenger back rest brought into the position illustrated in FIG. 1. This results in a relative movement of the rows of teeth 23 and 25, causing the flaps 20, 21 to be moved to a position wherein they once again are aligned with the side members 5, 6 when the passenger back rest is located in the rear position.

By operation of the handle 14, the locking device can once again provide locking of the back rest in this position.

The handle may be designed so that it can also be gripped for pulling the back rest in this manner.

It will be understood that a mechanism may also be provided corresponding to that mentioned above, comprising a control arm for the child seat on the other side of the chair.

Even though the spring arrangement may be advantageous for movement of the passenger back rest to the forward position, particularly if the person operating the chair is, e.g., holding a child with one hand and thus only has the other hand free, it will be understood that the chair does not need to be provided with such a gas spring. Moreover, it will be understood that instead of a gas spring, any kind of suitable spring, e.g. a helical spring, may be employed.

Figure 4:
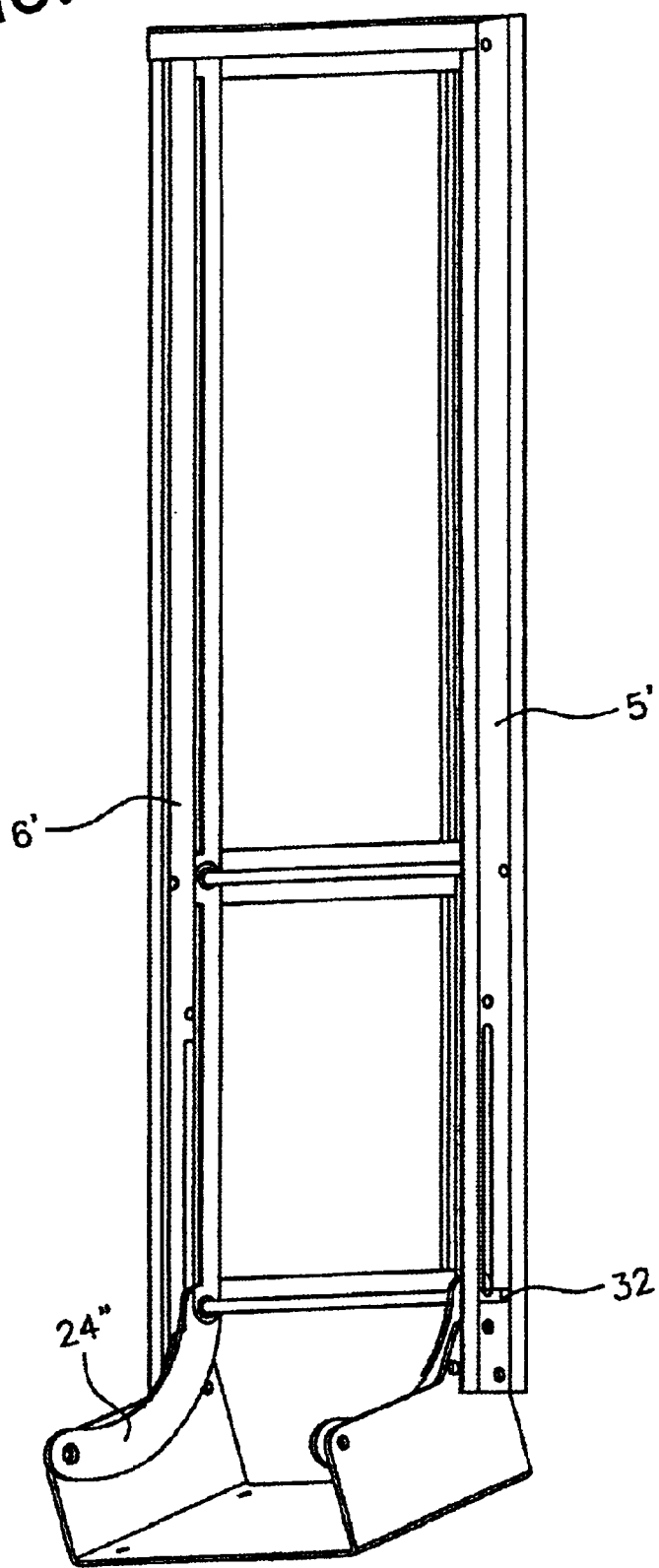
FIG. 4 is a perspective view resembling that illustrated in FIG. 1, but of a second embodiment of the passenger chair.
Figure 5:
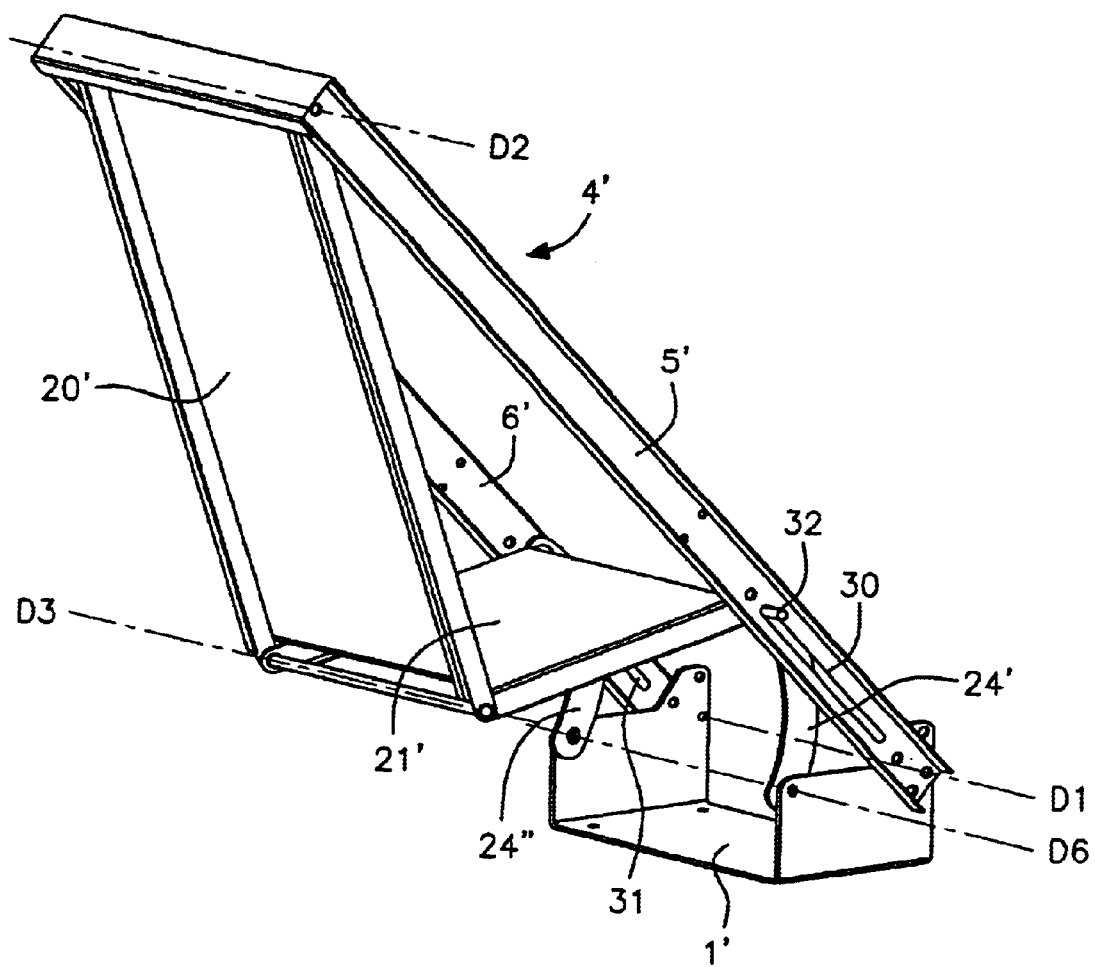
FIG. 5 is a perspective view of the passenger chair which is illustrated in FIG. 4, and which resembles the perspective view which is illustrated in FIG. 2.

FIGS. 4 and 5 illustrate a second embodiment of the passenger chair, where in connection with corresponding components the same reference numerals have been used as in FIGS. 1–3, but with the addition of an apostrophe.

As illustrated in FIGS. 4 and 5, a passenger back rest 4' of the passenger chair comprises two side members 5', 6'. The side members 5', 6' are linked with the frame 1' of the passenger chair 4', thus enabling them to pivot about an axis of rotation D1'. This passenger chair too comprises a first flap 20' and a second flap 21 ' and the first flap 20' is linked with an upper portion of the side members 5', 6'.

The second flap 21' has a first end portion via which it is linked with the first flap 20' and a second, opposite end portion, on one side or both sides of which is mounted a sliding body 32. The sliding body 32 is arranged to slide along the adjacent member 5', 6', while simultaneously permitting a rotation of the second flap 21' relative to the side members 5', 6'.

For example, the sliding body 32 may be composed of a cylindrical pin which projects laterally away from the second flap 21' and which is arranged to project into a longitudinal hole or slot 30 and 31 respectively of the adjacent side member 5' and 6' respectively, the longitudinal hole extending in the side member's longitudinal direction. The width of the slot may be slightly larger than the diameter of the pin.

At one side the passenger chair further comprises a control arm 24', one end portion of which is linked with the frame 1' at a point which is located slightly in front of the first axis of rotation D1', thus enabling it to pivot about a sixth axis of rotation D6. The control arm's opposite, second end portion is rotatably connected with the pin 32. The passenger chair may also have a control arm 24" of this kind at the other side.

When the passenger back rest is located in the rear position as illustrated in FIG. 4, the pin 32 is located at the lower end of the slot 30, and the flaps, the side members and the control arm extend substantially in the same plane.

By tilting the passenger back rest forwards, the control arm 24' pushes the pin 32 upwards in the slot 30, causing the front end of the second flap 21' to be moved towards the passenger back rest's upper end. The location of the linkage between the flaps is thereby moved forwards, thus forming a child chair as described above.

It will be understood that the sliding body 32 and the interacting portion of the side members may be formed in another way. Thus it may be formed as a piece (not illustrated) which grips a longitudinal rail or flange securely connected with the side member, which piece in turn may be rotatably connected with the second flap 21' and the control arm 24', 24".

In this embodiment too the side members may be extended downwards from the location of the first axis of rotation and be interconnected via a cross piece which can be influenced by a spring device for automatic movement of the passenger back rest forwards during the formation of the child chair.

What is claimed is:

1. A passenger chair for a transport means, where the passenger chair can be converted into a child chair, said passenger chair comprising
    a frame arranged to be attached to a floor of the transport means, and
    components interlinked in such a manner that they can rotate about axes of rotation extending horizontally and transversely relative to the frame, the components including
        a passenger back rest having side members extending along respective longitudinal sides of the passenger back rest from near the frame and upwards, and being linked at a bottom with respective upper, rear side portions of the frame, thus enabling the passenger back rest to be rotated above a first axis of rotation between a rear position, wherein the passenger back rest extends upwards and backwards, and a front position wherein the passenger back rest extends upwards and forwards, a first flap with an upper end portion linked with an upper portion of the passenger back rest, where the first flap can rotate about a second axis of rotation and form a child's back rest, and at least one mechanism connected to the frame and the passenger back rest respectively, the passenger back rest having a second flap with first and second end portions mounted opposite each other, the first end portion being linked with a lower end portion of the first flap, thus enabling the flaps to rotate relative to one another about a third axis of rotation, and the mechanism being arranged to move the second flap forcibly about the third axis of rotation and the first flap about the second axis of rotation when the passenger back rest is rotated about the first axis of rotation, whereby the first flap forms a child's back rest and the second flap forms a child seat of a child chair facing in the other direction relative to the passenger chair when the passenger back rest has been rotated to the front position, the mechanism including at least one control arm moving the second end portion of the second flap towards an upper portion of the passenger back rest.

2. A passenger chair according to claim 1, wherein the mechanism comprises an element securely connected with one of the upper, rear side portions of the frame, and a top of the element is in a form of a circular arc and provided with a row of teeth, the circular arc lying in a plane which is perpendicular to the axes of rotation, and a center of the circular arc lying on the first axis of rotation, and the control arm's first end portion is linked with a side member near the element and above element, the control arm being rotatable about a fourth axis of rotation and a bottom of the first end portion is in the form of a circular arc with a center on the fourth axis of rotation and provided with a row of teeth engaged with the row of teeth of the element, and the control arm's second end portion is linked with the second end portion of the second flap, thus enabling the second flap and the control arm to rotate relative to each other about a fifth axis of rotation, whereby the control arm and thereby the second flap are arranged to be forcibly rotated in a first direction, while the first flap is rotated in an opposite direction.

3. A passenger chair according to claim 1, wherein the control arm has a first end portion rotatably connected to the frame in front of the first axis of rotation, thus enabling the control arm to rotate about a sixth axis which is parallel to the first axis of rotation, and a second end portion which is rotatably connected to the second end portion of the flap, which has a sliding body which is arranged to slide along an adjacent side member while simultaneously providing a relative rotation of the side member and the second flap.

4. A passenger chair according to claim 1, wherein the passenger chair has a locking device so that the passenger back rest can be locked relative to the frame when the back is located in the rear or forward position, and also in positions between these positions.

5. A passenger chair for a transport means, where the passenger chair can be converted into a child chair, said passenger chair comprising
a frame arranged to be attached to a floor of the transport means, and
components interlinked in such a manner that they can rotate about axes of rotation extending horizontally and transversely relative to the frame, the components including
a passenger back rest having side members extending along respective longitudinal sides of the passenger back rest from near the frame and upwards, and being linked at a bottom with respective upper, rear side portions of the frame, thus enabling the passenger back rest to be rotated above a first axis of rotation between a rear position, wherein the passenger back rest extends upwards and backwards, and a front position wherein the passenger back rest extends upwards and forwards,
a first flap with an upper end portion linked with an upper portion of the passenger back rest, where the first flap can rotate about a second axis of rotation and form a child's back rest, and
at least one mechanism connected to the frame and the passenger back rest respectively,
the passenger back rest having a second flap with first and second end portions mounted opposite each other, the first end portion being linked with a lower end portion of the first flap, thus enabling the flaps to rotate relative to one another about a third axis of rotation, and
the mechanism being arranged to move the second flap forcibly about the third axis of rotation and the first flap about the second axis of rotation when the passenger back rest is rotated about the first axis of rotation, whereby the first flap forms a child's back rest and the second flap forms a child seat of a child chair facing in the other direction relative to the passenger chair when the passenger back rest has been rotated to the front position,
the mechanism including at least one control arm moving the second end portion of the second flap towards an upper portion of the passenger back rest, and
a spring device being connected to a front portion of the frame and a portion which is securely connected to the side member, and which is located below the first axis of rotation, whereby a force which is exerted by the spring device attempts to rotate the passenger back rest in a first direction relative to the frame.

6. A passenger chair according to claim 5, wherein the spring device is a gas spring.

7. A passenger chair according to claim 5, wherein the spring device comprises a locking device for locking the passenger back rest in a desired rotational position.

8. A passenger chair according to claim 7, wherein an operating handle for the locking device is mounted at an upper portion of the passenger back rest.

9. A passenger chair according to claim 8, wherein the operating handle also comprises a portion which can be gripped by a person for movement of the passenger back rest.

* * * * *